US006992697B2

(12) United States Patent
Ali

(10) Patent No.: US 6,992,697 B2
(45) Date of Patent: Jan. 31, 2006

(54) METHOD AND APPARATUS TO MEASURE VIDEO QUALITY ON ANY DISPLAY DEVICE WITH ANY IMAGE SIZE STARTING FROM A KNOW DISPLAY TYPE AND SIZE

(75) Inventor: Walid Ali, Montrose, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 525 days.

(21) Appl. No.: 10/175,607

(22) Filed: Jun. 19, 2002

(65) Prior Publication Data
US 2003/0234865 A1    Dec. 25, 2003

(51) Int. Cl.
H04N 17/00    (2006.01)
(52) U.S. Cl. ..................................... 348/189
(58) Field of Classification Search ........ 348/180–194; 382/272, 274, 254, 199, 228, 103, 104, 118, 382/141; 345/87
See application file for complete search history.

(56) References Cited

U.S. PATENT DOCUMENTS

| | | | | | |
|---|---|---|---|---|---|
| 5,446,492 | A | * | 8/1995 | Wolf et al. | 348/192 |
| 5,818,520 | A | * | 10/1998 | Janko et al. | 348/192 |
| 5,940,124 | A | * | 8/1999 | Janko et al. | 348/189 |
| 6,239,834 | B1 | * | 5/2001 | Miyaji et al. | 348/193 |
| 6,285,797 | B1 | * | 9/2001 | Lubin et al. | 382/254 |
| 6,493,023 | B1 | * | 12/2002 | Watson | 348/180 |
| 6,577,764 | B2 | * | 6/2003 | Myler et al. | 382/228 |
| 6,600,468 | B1 | * | 7/2003 | Kim et al. | 345/87 |
| 6,690,839 | B1 | * | 2/2004 | Ferguson | 382/274 |
| 6,704,451 | B1 | * | 3/2004 | Hekstra et al. | 382/199 |
| 6,734,898 | B2 | * | 5/2004 | Zeidler | 348/183 |
| 6,795,580 | B1 | * | 9/2004 | Janko et al. | 382/199 |
| 6,798,919 | B2 | * | 9/2004 | Ali et al. | 382/272 |

FOREIGN PATENT DOCUMENTS

| | | |
|---|---|---|
| DE | 19533966 | 3/1997 |
| EP | 991255688 | 6/2001 |
| WO | WO0030366 | 5/2000 |

* cited by examiner

Primary Examiner—Paulos M. Natnael
(74) Attorney, Agent, or Firm—Edward W. Goodman

(57) ABSTRACT

A method of measuring the video quality on display devices of differing types and/or sizes based on a known display type and size, said method includes the steps of: (a) obtaining a subjective quality score of video sequences viewed on a first display device; (b) obtaining an objective quality score of the video sequences in step (a); (c) obtaining a subjective quality score on a second display device, wherein the second display device having at least one difference in size and type than the first display device; (d) estimating an objective quality score for the second display device based on a correlation between the subjective and objective scores of the first display device, and the subjective score of the second display device. An apparatus and system provide hardware and modules to permit the measurement of video quality and optional fine tuning of the video quality of the second display based on the objective video quality scores.

28 Claims, 5 Drawing Sheets

|  | $F_1$ | $F_2$ | ... | $F_n$ | Objective Score (Composite F) on CRT | Subjective Score on CRT |
|---|---|---|---|---|---|---|
| Sequence$_1$ | | | | | | |
| Sequence$_2$ | | | | | | |
| Sequence$_m$ | | | | | | |

Objective (Composite F) scores and subjective score of a video set on a certain display type with a certain size

Fig. 1B

|  | $F_1$ | $F_2$ | ... | $F_{n+k}$ | Subjective Score on LCD |
|---|---|---|---|---|---|
| Sequence$_1$ | | | | | |
| Sequence$_2$ | | | | | |
| Sequence$_m$ | | | | | |

Subjective score of a video set on another display type with same/different display size

Fig. 2A

Warping the subjective score across different display types

An apparatus for estimating objective model across different display types/sizes

METHOD AND APPARATUS TO MEASURE VIDEO QUALITY ON ANY DISPLAY DEVICE WITH ANY IMAGE SIZE STARTING FROM A KNOW DISPLAY TYPE AND SIZE

BACKGROUND OF THE INVENTION

1. Field of the Invention

The present invention is related to systems and methods for evaluating and implementing video quality. In particular, the present invention is related to a method and apparatus to measure the video quality on any display device.

2. Description of the Related Art

The measurement of video quality often entails a combination of subjective and objective criteria. As subjective scoring is subject to a large degree of variation in the evaluation of a single video sequence, even among the same people performing an evaluation of the same sequence on different days, or at different times, a combined correlation of objective evaluation data and subjective evaluation data can provide a more accurate indication as to the video quality.

Objective quality can be measured by modules in a video system or device that provides an optimal objective quality for a given video sequence. Genetic algorithms, which can be used to evaluate video quality, that may or may not be part of a feedback system in which video quality is enhanced has been previously proposed by the present inventor in U.S. application Ser. No. 09/817,891 entitled "A general Scheme for Diffusing Different Implementations of a Number of Video Algorithms in an Optimum Way for Best Objective Video Quality (Filed Mar. 27, 2001) and U.S. application Ser. No. 09/734,823 entitled "A Scalable Dynamic Metric for Automatic Evaluation of Video Quality" (Filed Dec. 12, 2000), the contents of both application are hereby incorporated by reference as background material.

Current approaches to measure video quality are geared toward a certain display device and/or media (TV broadcasting, internet video streaming, etc.), having a fixed size. However, many people own displays of various sizes, from among large screens CRTs, projection screens, LCD screens, plasma, portable screens, etc. and the same video sequences appearing on the various types of displays may look better on some displays than others.

SUMMARY OF THE INVENTION

The present invention includes a method, apparatus and system to judge the video quality (improvement/degradation) on any display media with any display size. In an aspect of the present invention, there is a judgement based on a subjective evaluation by a panel of viewers on a set of video sequences displayed on a CRT based device, as well as on the sought display device. The present invention evaluates inter-display-size image quality for a particular video sequence or sequences. It should be noted that while size is being discussed, the type of display is also a factor that may be used (for example, a 17 inch CRT versus a 17 inch LCD).

Accordingly, by correlating the subjective score and objective score on a first device, and the subjective score on a second device, accurate objective scores for the second device can be calculated and used to provide maximum video quality to the second device.

BRIEF DESCRIPTION OF THE DRAWINGS

FIG. 1B is a table that illustrates individual metrics and composite objective and subject scoring for a first display.

FIG. 2A illustrates video measurement metrics for a series of video sequences and a subjective score for a second display.

DETAILED DESCRIPTION OF THE INVENTION

Figure 1A:
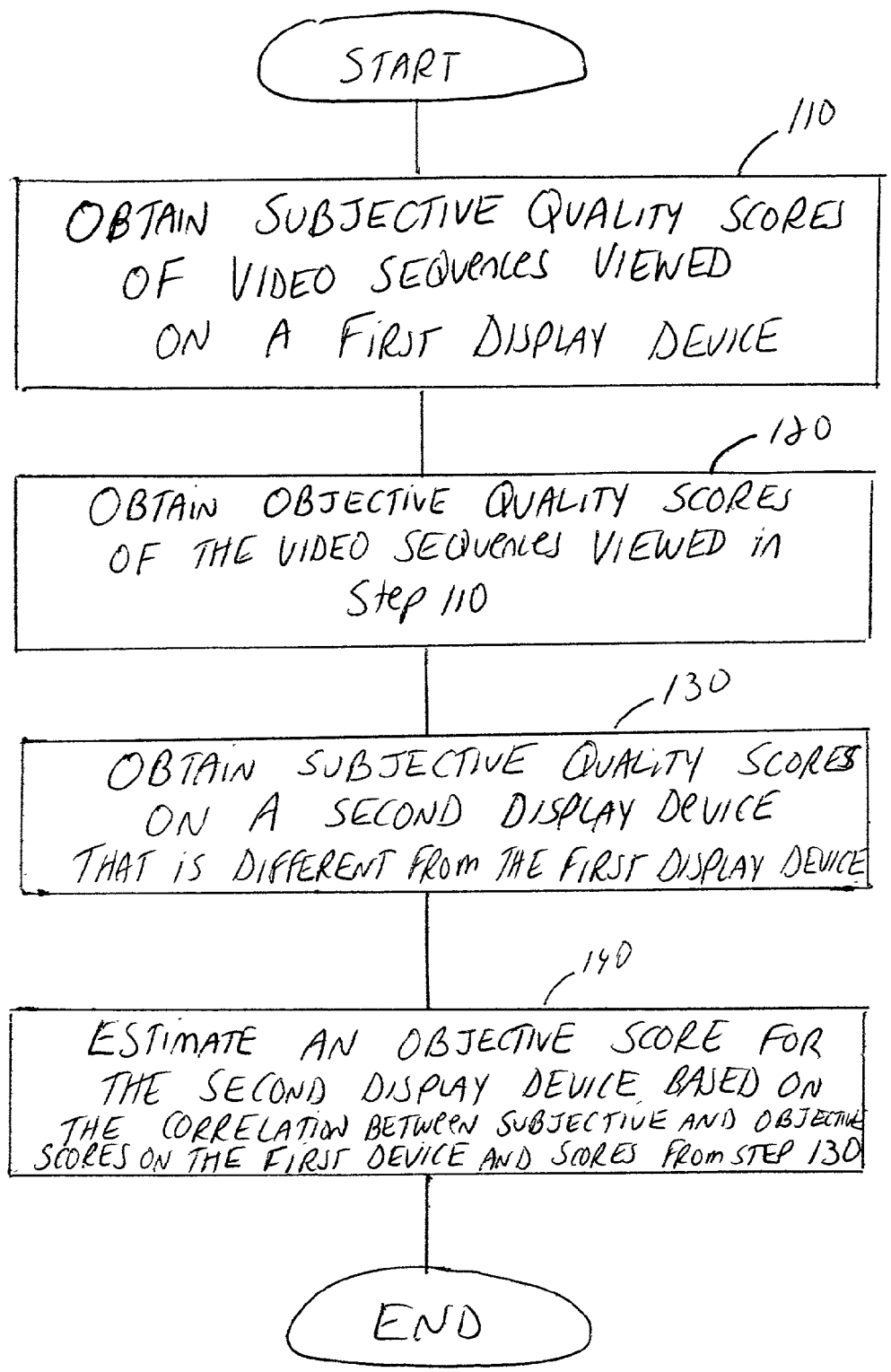
FIG. 1A is a flowchart providing an overview of a method according to the present invention.

FIG. 1A is a flowchart providing a general overview of a method according to the present invention.

At step 110, the subjective quality scores of video sequences are viewed on a first display are obtained. This step may typically involve a panel of viewers watching a particular video sequence, and rating the video quality during or shortly after the viewing.

At step 120, objective quality scores are obtained using a set of video metrics. There are many ways to combine the individual measurements into a composite to best correlate the subjective scores of a set of video sequences, such as discussed by the present inventor in U.S. Ser. No. 09/734, 823 entitled "A Scalable Dynamic Objective Metric for Automatic Video Quality Evaluation", filed Dec. 12, 2000 and incorporated by reference as background material. The methods in this disclosure proved to be successful and resulted in a high rate of correlation between the subjective evaluation and the estimated objective evaluation for a certain/specific size display.

At step 130, the subjective quality scores (preferable for the for the same video sequence) of a video sequence having a different size (or type of display) are obtained from subjective scoring by a panel of viewers. It should be noted that the second display may be a different size and/or type.

In addition, the set of video sequences will also be measured using a set of video measurement metrics ($F_1$ to $F_N$, or a superset of them).

At step 140, there is an estimation of the objective score for the second display device based on the subjective scores for both the first and second displays, and the objective score for the first display. In other words, a newer model is estimated from a previously known model so as to provide an objective score for the second display.

FIG. 1B shows a table with a series of measurements, a composite objective score, and subjective score for two video sequences. Typically, there are a series of simple measurements (e.g. $F_1$ to $F_N$). A composite score is subsequently obtained.

FIG. 2A illustrates video measurement metrics for a series of video sequences and a subjective score for a second display. The difference between the subjective score on FIG. 1B and the subjective score in FIG. 2A embodies the subjective difference between the picture quality between the two display types.

One way that the estimation of the objective score for the second display can be made is by "warping" the subjective score of the new display around the subjective score of the first display. For example, a non-linear regression between the two data sets (Sequence$_1$ . . . Sequence$_m$ versus the subjective score on the second display).

Figure 2B:
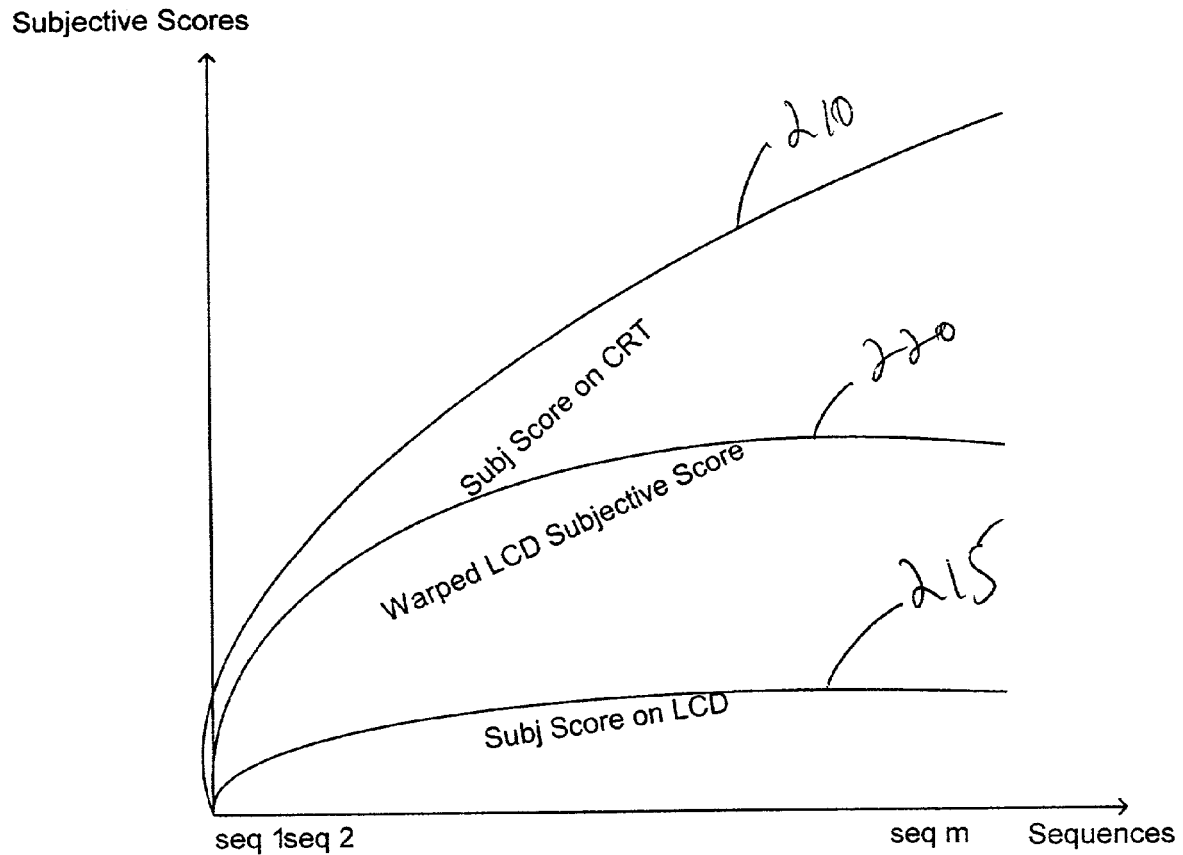
FIG. 2B illustrates the warping of the subjective score of the second display.

FIG. 2B illustrates the warping of the subjective score from the first display to the second display. The curve 210 represents the subjective score of the first display device versus the video sequences. The curve 215 represents the subjective score of the second display for the video sequences. The curve 220 represents the warped score based on the non-linear regression between the two data sets.

Subsequent to the obtaining the warped subjective score for the second display, a parametric maximum likelihood problem may be used to estimate the model and its parameters that will maximize the correlation with the subjective scores in FIG. 2A. The documents "Optimizing a Random System of Cascaded Video Processing Modules by Parallel Evolution Modeling" by Walid Ali and Kees van Zon (Proceedings of ICIP 2001 Conference, October 2001) and "Statistical Signal Processing: Detection, Estimation and Time Series Analysis by L. L. Scharf (Addison Wesley Longman, ISNB: 0201190389, 1991) are hereby incorporated by reference as background material regarding, inter alia, a parametric maximum likelihood problem.

The estimated objective scores for the second display can then be used to maximize the video quality on the second display.

Figure 3:
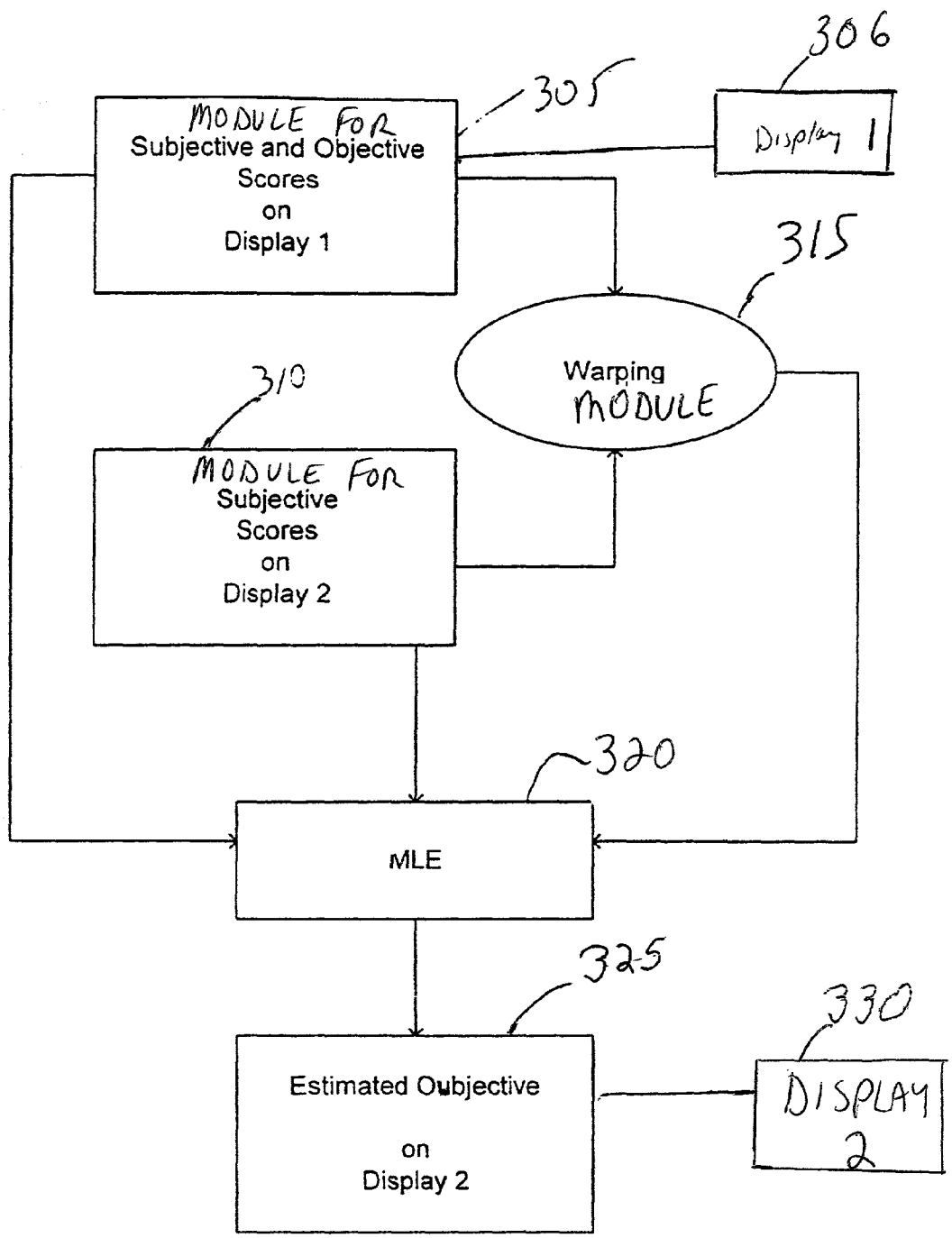
FIG. 3 illustrates a block diagram of one embodiment of apparatus according to the present invention.

FIG. 3 illustrates an apparatus for estimating video quality according to the present invention. The subjective and objective scores for the first display may be stored in a first display information module 305. This module would contain all the subjective measured metrics and the objective metrics shown in FIGS. 1A and 2A, for example, for a first display 306. The subjective scores for the second display are stored in the second display information module 310. It is from the data in these two modules in which the objective score for the second display 330 will be estimated. It should be understood that the data for the first display may have already been previously recorded in a storage area (not shown).

The warp module 315 is used for the warping of the subjective score of the second display around the subjective score shown in FIG. 1B. This warping is carried out by the non-linear regression between the two sets of data (sequences vs. subjective score of first display) and sequences versus subjective score of second display.

The MLE function can then be performed by the MLE module 320, typically a processor, to build a parametric maximum likelihood estimation problem to estimate the model and its parameters that will maximize the correlation with FIG. 2A. Alternatively, a single processor can perform both the MLE function and warp function. The estimate objective scores for the second display can then be used by a video processor that is communicating with the display, so as to provide the optimum quality for that video segments on the second display. The objective scores for the second display can be stored in a module 325 or memory area 330, or by a display video unit. Thus the apparatus, system, and method can be used to maximize quality of the second display dependent upon the correlation between the first display and second display. Thus, the subjective scores for both displays and the objective scores for the known (first) display are used, so as to obtain the optimum quality on different sizes and/or different types of displays.

One way that the objective can be calculated can be through the use of Genetic Algorithms. Genetic Algorithms (GA's) are procedures that maintain a group of potential "candidate" solutions, which are evaluated and assigned a fitness value. GA's are known procedures to solve complex problems, and the section entitled book "Genetic Algorithms in Optimization and Adaptation" of a book entitled Advances in Parallel Algorithms, by Kronsjo and Shumshesuddin, pages 227–276 (1990)

For each generation for video system designs, each candidate is evaluated and is assigned the fitness value, which represents how good (or bad) is the resulting image quality. The image quality is measured by an objective metric, which is a subsystem that tries to mimic the human vision system to decide on the quality of images.

The image quality is generally a function of the decoded bits contained in each candidate's chromosome. Genetic algorithms select some of these candidates for the reproduction in the next generation based on their fitness values (e.g. how good is the image quality resulting from this system). The selected candidates are combined using the genetic recombination operation cross over and mutation. The termination criteria are triggered when finding an acceptable approximate solution, reaching a specific number of generations, or until the solution converges.

Various modifications can be made by a person of ordinary skill in the art that do not depart from the spirit of the invention, or the scope of the appended claims. For example, it is possible that instead of genetic algorithms, simulated annealing or a tabu search could be performed to find the objective metrics for the first display. The video sequences and/or optimization modules can be different from those illustrated, and the objective image quality metrics may vary according to need.

What is claimed is:

1. A method of measuring the video quality on display devices of differing types and/or sizes based on a known display type and size, said method comprising the steps of:
   (a) obtaining a subjective quality score of video sequences viewed on a first display device;
   (b) obtaining an objective quality score of the video sequences in step (a);
   (c) obtaining a subjective quality scare on a second display device, wherein said second display device has at least one difference in size and type than the first display device;
   (d) estimating an objective quality score for the second display device based on a correlation between the subjective and objective scores of the first display device, and the subjective score of the second display device.

2. The method according to claim 1, further comprising:
   (e) providing the estimated objective scores of the second display device to a video processing unit so as to display the video sequences according to the estimated objective scores.

3. The method according to claim 1, wherein the first display device is a cathode ray tube (CRT) and the second display device is one of a Liquid Crystal Display (LCD).

4. The method according to claim 1, wherein the first display is a Liquid Crystal Display (LCD) and the second display is a cathode ray tube (CRT).

5. The method according to claim 1, wherein the first display has a different diagonal length than the second display.

6. A method of measuring the video quality on display devices of differing types and/or sizes based on a known display type and size, said method comprising the steps of:
   (a) obtaining a subjective quality score of video sequences viewed on a first display device;
   (b) obtaining an objective quality score of the video sequences in step (a);

(c) obtaining a subjective quality score on a second display device, wherein said second display device has at least one difference in size and type than the first display device;

(d) estimating an objective quality score for the second display device based on a correlation between the subjective and objective scores of the first display device, and the subjective score of the second display device, wherein step (d) includes:

(i) warping the subjective score of the second display around the subjective score of the first display by performing a non-linear regression between the respective subjective scores.

7. The method according to claim 6, wherein step (d) further includes:

(ii) estimating a model and parameters to maximize correlation with the subjective score of the first and second displays by providing a parametric maximum likelihood estimation problem.

8. The method according to claim 1, wherein the subjective quality score in step (a) comprises a composite score including a plurality of individual metrics.

9. The method according to claim 1, wherein the objective quality score in step (b) comprises a composite metric including a plurality of individual metrics.

10. The method according to claim 1, wherein the subject quality score in step (a) comprises a composite score including a plurality of individual metrics.

11. The method according to claim 1, wherein the estimated objective quality score is a composite score including a plurality of individual metrics.

12. An apparatus for measuring the video quality on display devices of different types and/or sizes based on a known display type and size, said apparatus comprising:

(a) means for obtaining a subjective quality score of video sequences viewed on a first display device;

(b) means for obtaining an objective quality score of the video sequences in that received a subjective quality score in (a);

(c) means for obtaining a subjective quality score on a second display device, wherein said second display device has at least one difference in size and type than the first display device;

(d) means for estimating an objective quality score for the second display device based on a correlation between the subjective and objective scores of the first display device, and the subjective score of the second display device.

13. The apparatus according to claim 12, further comprising:

(e) means for providing the estimated objective scores of the second display device to a video processing unit so as to display the video sequences according to the estimated objective scores.

14. The apparatus according to claim 12, wherein the first display device is a cathode ray tube (CRT) and the second display device is one of a Liquid Crystal Display (LCD).

15. The apparatus according to claim 12, wherein the first display is a Liquid Crystal Display (LCD) and the second display is a cathode ray tube (CRT).

16. The apparatus according to claim 12, wherein the first display and the second display have a different diagonal length.

17. An apparatus for measuring the video quality on display devices of different types and/or sizes based on a known display type and size, said apparatus comprising:

(a) means for obtaining a subjective quality score of video sequences viewed on a first display device;

(b) means for obtaining an objective quality score of the video sequences in that received a subjective quality score in (a);

(c) means for obtaining a subjective quality score on a second display device, wherein said second display device has at least one difference in size and type than the first display device;

(d) means for estimating an objective quality score for the second display device based on a correlation between the subjective and objective scores of the first display device; and the subjective score of the second display device, wherein the means for estimating includes:

(i) means for warping the subjective score of the second display around the subjective score of the first display by performing a non-linear regression between the respective subjective scores.

18. The apparatus according to claim 17, wherein the means for estimating further includes:

(ii) means for estimating a model and parameters to maximize correlation with the subjective score of the first and second displays by providing a parametric maximum likelihood estimation problem.

19. The apparatus according to claim 12, wherein the subjective quality score for the first display comprises a composite score including a plurality of individual metrics.

20. The apparatus according to claim 12, wherein the objective quality score for the first display comprises a composite metric including a plurality of individual metrics.

21. The apparatus according to claim 12, wherein the subject quality score of the second display comprises a composite score including a plurality of individual metrics.

22. The apparatus according to claim 12, wherein the estimated objective quality score is a composite score including a plurality of individual, metrics.

23. A system for measuring video quality of a first display and a different display, said system comprising:

a first display information module comprising subjective and objective scores of a first display;

a second display information module comprising subjective scores of a second display;

a warping module for receiving the subjective scores output from the first display and the second display and for warping the subjective scores of the second display around the subjective scores of the first display by non-linear regression; and a Maximum Likelihood Estimation (MLE) module for building a parametric maximum likelihood estimation problem to estimate objective scores for the second display.

24. The system according to claim 23, further comprising an estimated objective score module for the second display that communicates at least with the MLE module and provides the estimated objective scores for the second display.

25. The system according to claim 23, wherein the second display comprises at least one of a different size and type than the first display, and the warping module and the MLE provide the estimated objective quality score based on a correlation of the subjective and objective scores of the first display and the subjective scores of the second display.

26. The system according to claim 25, wherein subjective score and objective score of the first display and the subjective and estimated objective quality score for the second display are composite scores comprising a respective plurality of metrics.

27. The system according to claim 23 wherein the first display is a Cathode Ray Tube (CRT) display and the first display information module includes subjective and objective information for the CRT, and the second display is a Liquid Crystal Device (LCD) and the second display information module includes subjective and estimated objective information for the LCD.

28. The system according to claim 23 wherein the first display is a Liquid Crystal Display (LCD) display and the first display information module includes subjective and objective information for the LCD, and the second display is a Cathode Ray Tube (CRT) and the second display information module includes subjective and estimated objective information for the CRT.

* * * * *